March 7, 1967 G. DE COYE DE CASTELET 3,307,364
PELTIER EFFECT AIR CONDITIONING OF AUTOMOTIVE VEHICLES
Filed Aug. 23, 1965
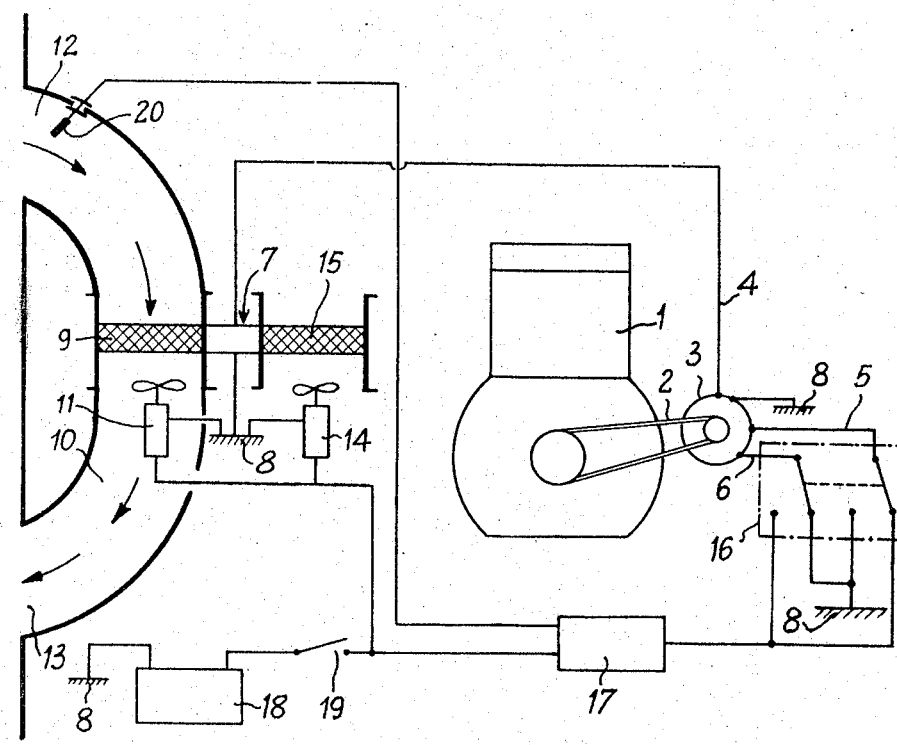
Inventor
Gaetan De Coye De Castelet
Stevens, Davis, Miller & Mosher
Attorneys

United States Patent Office 3,307,364
Patented Mar. 7, 1967

3,307,364
PELTIER EFFECT AIR CONDITIONING OF AUTOMOTIVE VEHICLES
Gaetan de Coye de Castelet, Billancourt, France, assignor to Regie Nationale des Usines Renault, Billancourt, France
Filed Aug. 23, 1965, Ser. No. 481,476
Claims priority, application France, Sept. 8, 1964, 987,431, Patent 1,414,889
4 Claims. (Cl. 62—3)

Up to now air conditioning of the inner space of passenger automotive vehicles powered by internal combustion engines was frequently based, at least as far as the cooling system is concerned, on the use of compressor-type air-cooling units.

One drawback characterizing these systems is the necessity of interposing a clutch between the compressor and the drive from the vehicle power unit, this clutch being controlled as a function of the temperature prevailing in the passenger compartment.

This invention provides a simpler solution to this problem which avoids the drawback set forth hereinabove by utilizing for air-conditioning purposes Peltier-effect thermoelectric elements.

However, in this case it is necessary to have an electric-current supply source of a power rating ranging from one fraction of a kilowatt to several kilowatts. Now, it is scarcely possible, without resorting to special means, to connect a generator having a rated output of several kilowatts with variable consumption values in parallel with a 30 to 50 ampere-hours automotive storage battery of which the operating voltage varies with time.

Therefore, according to the present invention, the Peltier-effect thermoelectric battery, of which one of the two radiators is interposed in the air-conditioned circuit of the passengers' room, the other radiator being mounted externally of this compartment, is fed with electric current from an electric current generator separate from the vehicle electrical equipment, such as the one utilized inter alia for ignition, lighting and other purposes, this generator being driven from the power unit of the vehicle.

Advantageously the generator may consist of an alternator equipped with rectifying diodes of the excitation or permanent magnet type.

This addition is advantageous not only in that it permits preserving the basic electrical equipment of the vehicle, but also in that it permits selecting at will the operating voltage of the Peltier effect elements, for example 24 volts in the case of a 12-volt lighting, ignition and like system.

With the air-conditioning system of this invention the temperature control within the passengers' compartment is extremely easy in that it is only necessary to adjust the excitation of the alternator or its equivalent in the form of permanent magnets for varying the voltage output across its terminals, and therefore the quantity of heat liberated or absorbed by the system. The heat power released by the Peltier elements will be automatically limited, even in case of incident, by the maximum output of the alternator which is moderately dependent on speed, except at very low r.p.m.'s.

The manual control may utilize low-power circuits and on the other hand with the excitation cut out the generator will absorb but little engine power, thus avoiding the use of an electrical clutch as contrasted with compressor-type air-cooling or conditioning systems.

This invention also applies to the disposal and general circuit arrangement of the component elements of the system. A typical and preferred form of embodiment thereof will now be described by way of example with reference to the accompanying diagrammatic drawing.

In the single figure of the attached drawing the reference numeral 1 designates the power unit driving through a suitable transmission such as a V-belt 2 and electrical generator 3 comprising a power output 4 and a control circuit 5 and 6. This control circuit is adapted to regulate the voltage and polarity at the output power terminal 4 as a function of the direction of the control current in said circuit and either the voltage or the amperes of this current.

One of the terminals of the Peltier-effect thermoelectric battery 7 is connected to the power output 4, the other terminal being connected to the power circuit of generator 3 through the ground or chassis 8 of the vehicle.

The radiator 9 of the thermoelectric battery is mounted within a duct 10 opening at both ends into the passenger compartment of the vehicle. An electrical fan 11 is also mounted in the duct 10 for circulating the air drawn into the duct at its inlet 12 and delivered into the passenger compartment at its outlet 13. Another electrical fan 14 is adapted to maintain an air flow through the other radiator 15 of the thermoelectric battery 7. This other air stream permits liberating to the outer atmosphere either the heat released from the radiator 15 when the battery is operated for cooling the passenger compartment, or the cold produced in this radiator when the system is used for heating purposes.

A two-way or reversing switch 16 is provided for changing the polarities of the control circuit 5 and 6 of the generator. This reversing switch is connected to a regulator 17 fed with current from the storage battery 18 of the vehicle which also supplies energizing current to the fan motors 11 and 14. A switch 19 is provided for cutting off the supply of current to said fans 11 and 14 and also to the regulator 17.

This regulator is adapted to deliver from the storage battery 18 a control voltage or current consistent with the temperature prevailing in the passenger compartment or in the duct 10. This temperature parameter is transmitted to the regulator by means of a probe 20. This probe 20 is advantageously mounted in the duct 10 upstream of radiator 9.

Of course, the temperature parameter may be transmitted from the probe through any suitable and known means. Thus, this probe may operate according to the gas expansion principle, the gas expansion or pressure variations causing in the regulator 17 corresponding variations in the output voltage or current. The probe may also be of a known electrical type and comprise a set of bimetallic strips or a plurality of switch means controlling for example two energy levels. It may also be of the so-called thermistor type having a high negative coefficient of temperature.

The regulator may also be of any known and suitable type, its only function consisting in releasing variable voltages or currents into the generator control circuit 5 and 6 as a function of information transmitted from the probe responsive to the temperature prevailing in the passenger compartment. According to the type of probe utilized, the regulator may be of mechanical, electronic or vibrating type. If a vibrating electromagnetic regulator is used, the probe may be mounted in series with an equalizing winding.

The above-described device is completely symmetric in that it will heat or cool at will, although its primary advantage resides in its operation as a cooling system.

I claim:
1. An air-conditioning system for the passenger compartment of automotive vehicles comprising a Peltier effect thermoelectric battery having two radiators, duct means having an inlet and an outlet in said compartment for circulating air therein, one of said radiators being interposed substantially in the middle of said duct means, the other said radiator being mounted externally of both said duct and said compartment, an electric current gen- erator means connected to said thermoelectric battery and driven from the vehicle engine, said generator being separate from the vehicle electrical system generator, a temperature responsive probe disposed within said duct adjacent the inlet thereof, regulator means responsive to said probe to regulate said generator according to the temperature sensed.

2. An air-conditioning system according to claim 1 further comprising a generator control circuit, said regulator means being connected to said generator control circuit and deriving its operating energy from a vehicle storage battery.

3. An air-conditioning system according to claim 2 wherein a reversing switch is provided for reversing the polarities of said generator control circuit, said generator being operatively connected so that when the polarities of said generator control circuit are reversed the polarities of the current supplied by said generator to said thermoelectric battery are reversed.

4. An air-conditioning system according to claim 1 further comprising two separate air circulation means, the first of said air circulation means being located in said duct means adjacent said radiator to force circulation of air therethrough, the second of said air circulation means being connected to the ambient air outside said vehicle and lying adjacent said other radiator to force circulation of air therethrough.

References Cited by the Examiner
UNITED STATES PATENTS

| | | | |
|---|---|---|---|
| 3,138,934 | 6/1964 | Roane | 62—3 |
| 3,171,505 | 3/1965 | Imelmann | 62—3 |
| 3,216,205 | 11/1965 | Milligan | 62—3 |

WILLIAM J. WYE, *Primary Examiner.*